Patented Oct. 9, 1951

2,570,532

UNITED STATES PATENT OFFICE 2,570,532

ALUMINUM HYDROXIDE-MAGNESIUM PHOSPHATE PHARMACEUTICAL COMPOSITION, METHOD THEREFOR, AND THIXOTROPY THEREOF

Harry Eisenberg, Benjamin Wilson Allan, and Reuben Roseman, Baltimore, Md., assignors of three-ninths to said Eisenberg, three-ninths to said Allan, and three-ninths to Benjamin Gaboff, all of Baltimore, Md.

No Drawing. Application September 5, 1947, Serial No. 772,466

10 Claims. (Cl. 167—55)

This invention relates to a new and novel composition of matter, and process for producing this composition, having novel properties and characteristics of especial utility, and of particular utility as an antacid composition when used as a gastro-intestinal medicament in the treatment of peptic ulcer and gastric hyperacidity.

The present invention novelly provides for the above purpose a distinctly useful composition comprising an interacting combination of aluminum hydroxide, tribasic magnesium phosphate, aluminum phosphate, and magnesium hydroxide.

An important advantage of this novel composition is that in use in this combination the effectiveness of each of these compounds as an antacid, that has been heretofore found to attain when separately employed for the purpose, is retained, while their known inherent disadvantages are eliminated or overcome.

The present invention also further provides a novel composition of these compounds, and method of preparing the same, that is thixotropic (see H. Freundlich, "Thixotropy," No. 267 of "Actualités scientifiques et industrielles," Hermann et Cie, Paris, 1935), that is, capable of an isothermal, reversible sol-gel transformation, being liquefied on shaking and setting up spontaneously on standing.

An important advantage of this further feature of composition invention is that the compounds in a liquid vehicle are non-settling, the compounds being maintained stably in uniformly dispersed condition throughout the mixture. It is therefore not necessary to shake the liquid mixture to disperse the compounds until in proper proportions for the predetermined dosage. The product is shaken merely for liquefaction for easy pouring. Upon standing undisturbed, spontaneous reversion to the gel state occurs, but the product is capable of alternate liquefaction on shaking and setting up spontaneously into a rigid gel upon standing undisturbed. This phenomenon can be repeated indefinitely.

The invention has for further objects such other improvements and such other operative advantages or results as may be found to obtain in the composition and process hereinafter described and claimed.

The present invention makes advantageous use of the discovery that if, to a water suspension of hydrated aluminum hydroxide, tribasic magnesium phosphate is added, there is ultimately produced an equilibrium mixture which, in addition to the original reactants, contains aluminum phosphate and magnesium hydroxide, in accordance with the following reversible chemical equation:

$$2Al(OH)_3 + Mg_3(PO_4)_2 \rightleftarrows 2AlPO_4 + 3Mg(OH)_2$$

Proof of this is provided by the following:

(1) Quoting Treadwell-Hall, "Analytical Chemistry" (1937), vol. I, p. 29, and Hogness and Johnson, "Ionic Equilibrium as Applied to Qualitative Analysis" (1941), p. 55, respectively: "in principle, all reactions are reversible," and "all reactions may be regarded as reversible." While the principle of reversibility is well known, we have discovered a new reaction and a new composition of matter, which reaction and composition we believe to represent a distinct advance in the field of pharmaceutical chemistry and gastro-intestinal medication.

(2) Magnesium hydroxide is more insoluble than magnesium phosphate (see data cited below).

(3) X-ray diffraction data wherein, for example, employing dried samples of the product of this invention prepared as in the batch record example given below, characteristic powder diffraction patterns of both magnesium phosphate and magnesium oxide were obtained. Thus, the following table lists the measurements (in angstroms) and relative intensities of the lines obtained by us compared to those found in the Card File of X-Ray Diffraction Data, published by the American Society for Testing Materials and the National Research Council (1944, etc.). While in the dried product of this invention only two lines for MgO are definitely distinguished, it is to be pointed out that these correspond (in the proper order of intensity) to the two strongest lines given by the A. S. T. M. and the N. R. C. for MgO. It is to be noted that the data obtained by us for magnesium phosphate are on material such as is used in our process, and that the diffraction pattern is entirely free of any lines attributable to magnesium oxide.

X-ray diffraction data

| Date obtained by present inventors | | | | | | Data given by A. S. T. M., N. R. C. | | | |
|---|---|---|---|---|---|---|---|---|---|
| Dried Product of present invention | | $Mg_3(PO_4)_2 \cdot 8H_2O$ | | MgO | | $Mg_3(PO_4)_2 \cdot 8H_2O$ | | MgO | |
| d | $I/I_1$ | d | $I/I_1$ | d | $I/I_1$ | d | $I/I_1$ | d | $I/I_1$ |
| 7.924 | .7 | 7.972 | .6 | | | 7.7 | 0.24 | | |
| 6.687 | 1.0 | 6.808 | 1.0 | | | 6.7 | 1.00 | | |
| 3.166 | .2 | 3.177 | .2 | | | 3.19 | 0.08 | | |
| 2.928 | .6 | 2.944 | .7 | | | 2.94 | 0.32 | | |
| 2.677 | .5 | 2.685 | .6 | | | 2.69 | 0.32 | | |
| 2.505 | .3 | 2.514 | .4 | | | 2.51 | 0.24 | | |
| 2.405 | .2 | 2.416 | .5 | | | 2.40 | 0.16 | | |
| 2.188 | .1 | 2.203 | .1 | | | 2.20 | 0.08 | | |
| 2.035 | .1/2 | 2.053 | .1 | | | 2.05 | 0.08 | | |
| 1.664 | .1/2 | 1.661 | .1/2 | | | 1.66 | 0.08 | | |
| 1.561 | .1/2 | 1.565 | .1 | | | 1.57 | 0.08 | | |
| 1.328 | .1/2 | 1.332 | .1 | | | 1.33 | 0.08 | | |
| 2.119 | 1.0 | | | 2.104 | 1.0 | | | 2.10 | 1.00 |
| 1.494 | .4 | | | 1.485 | .8 | | | 1.485 | 0.75 |

Now each of the substances in the above equation is a relatively insoluble compound. Thus, the "Handbook of Chemistry and Physics," 29th edition (1945), edited by Hodgman, gives the following solubility data:

$Al(OH)_3$ (or $Al_2O_3 \cdot 3H_2O$)—
 0.00015 g./100 ml. of $H_2O$, at 20° C.
$Mg_3(PO_4)_2 \cdot 4H_2O$—0.0205 g./100 ml. of $H_2O$.
$AlPO_4$—insoluble.
$Mg(OH)_2$—0.0009 g./100 ml. of $H_2O$, at 18° C.

Furthermore, each of the above substances, despite certain inherent disadvantages, has been employed effectively as an antacid by the medical profession. See, for example, the work of the eminent authorities, Ivy, Friedenwald and Morrison; and such brand names as "Amphojel" ($Al(OH)_3$), "Phosphaljel" ($AlPO_4$), and "Milk of Magnesia" ($Mg(OH)_2$), which are well known to those skilled in the art.

The novelty of the present invention resides in the discovery of a composition, and method therefor, providing for the above chemical reaction, wherein two relatively insoluble chemical entities, each of which has desirable antacid qualities together with certain undesirable qualities, are brought together to yield, partially, two other relatively insoluble chemical entities likewise possessing certain desirable and undesirable qualities, but wherein the equilibrium mixture is of distinctly superior value as an antacid, possessing as it does all of the good features and none of the bad features of the individual components. Thus, the equilibrium mixture, providing a nice balance of pure, clearly defined, insoluble chemicals, combines the well-known advantages of alumina medication with none of the disadvantages, such as phosphate depletion and constipation, these latter disadvantages being counterbalanced, respectively, by the presence of phosphatic compounds and magnesian compounds in the equilibrium mixture.

As a result of numerous clinical trials over an extended period of time and under the supervision of men skilled in the field of gastro-enterology, there is ample proof of the distinct superiority and efficacy of the present composition of matter as an antacid and in peptic ulcer therapy.

Having thus broadly described the discovery of the present invention, the following example, taken from one of the batch records, is given by way of illustrating the preferred form of the invention, but the invention is not to be construed as limited in all its aspects thereto, since it will be apparent, for example, from the present description, and especially from the above noted equation illustrating the continuous reversible nature of the reaction, that the original reactants as initially employed as the original starting materials may be aluminum phosphate and magnesium hydroxide, instead of aluminum hydroxide and magnesium phosphate. The latter species is preferred over the former species as the original starting material for the reason that the latter species, aluminum hydroxide and magnesium phosphate, has the unexpected advantage and utility over the former species, aluminum phosphate and magnesium hydroxide, since aluminum hydroxide is more readily available in larger commercial quantities, and at less cost, than aluminum phosphate; and so more of the same desired equilibrium mixture can be made available, and at less cost, by starting first with the preferred species, aluminum hydroxide and magnesium phosphate, than by starting first with the other species, aluminum phosphate and magnesium hydroxide.

Aluminum hydroxide-magnesium phosphate gel

The formula for preparing a 36-gallon batch of the aluminum hydroxide-tribasic magnesium phosphate gel product is as follows:

| | |
|---|---|
| Aluminum hydroxide gel hydrate, representing 9% $Al_2O_3$ _____lbs__ | 128 |
| Precipitated tribasic magnesium phosphate _____lbs__ | 12 |
| Sodium benzoate _____grams__ | 334 |
| Distilled water _____lbs__ | 161 |
| Sodium saccharin, oil of peppermint _____grams__ | 50 |
| Total_____lbs__ | 301.8 |

The aluminum hydroxide gel and the precipitated tribasic magnesium phosphate are weighed carefully and transferred to a stainless steel tank. The water necessary to hydrate the two active components and to form a slurry is then added. The mixture is agitated at 1750 R. P. M. for 36–48 hours, during which time the sodium benzoate is added. The mixing is then discontinued for 12–24 hours, while hydration proceeds. At the end of this time the agitation at 1750 R. P. M. is started up again and continued for about 24 hours longer, during which time the flavor and saccharin are added. The sodium benzoate acts as a mild preservative only. Following agitation for this further 24-hour period, the reaction mixture is allowed to hydrate for about 12 hours longer, at the end of which time the suspension is smooth, creamy, and homogeneous, free of any lumps. The mixture is then filtered to remove any dehydrated particles of raw material, filled into suitable glass containers, and the containers securely closed air-tight. The containers, filled with the mixture, are then subjected to a temperature of between 75–85 degrees centigrade, under pressure, for from two to four hours, in an electric oven. After the process of heating under pressure the mixture in the containers is observed to be very gelatinous, and exhibits, markedly, the property of thixotropy. The containers are allowed to cool to room temperature, shaken well, and packaged for usage.

For use as an antacid indicated in the treatment of gastric hyperacidity and peptic ulcer, the composition preferably comprises, initially, a palatable combination of aluminum hydroxide gel $(Al(OH)_3)$, 5.5%, and tribasic magnesium phosphate $(Mg_3(PO_4)_2.8H_2O)$, 4%. In said ratio, the $Al(OH)_3$ and $Mg_3(PO_4)_2$ are in the ratio of 1:1.25 on a chemical equivalent basis. These percentages may, however, vary as desired from 4–8% for the aluminum hydroxide and from 2–8% for the magnesium phosphate (0.726–1.452; 0.625–2.5 chemical equivalent basis), without adversely affecting the liquefaction of the mixture for administering the dosage in liquid form, as occurs in the use of higher percentages. The dosage is, or may be, one or two teaspoonfuls as liquid mixture to be taken 5 or 6 times daily, between meals or otherwise, as directed by a physician.

The composition is also a useful vehicle in combined medication, as with bromides, phenobarbital, belladonna, stramonium, and atropine.

From the foregoing, it will be noted that the composition of the present invention, and the method of preparing this novel composition, provide a stabilized suspension of tribasic magnesium phosphate, aluminum hydroxide, aluminum phosphate, and magnesium hydroxide, which suspension does not separate out, on standing, into its component parts.

The invention also makes provision for a composition of tribasic magnesium phosphate, aluminum hydroxide, aluminum phosphate, and magnesium hydroxide, in the novel form of a stabilized thixotropic gel.

It likewise provides an equilibrium mixture of tribasic magnesium phosphate, aluminum hydroxide, aluminum phosphate, and magnesium hydroxide, in a common carrier, or liquid vehicle, such as water.

In addition, the present invention provides a novel process for making a novel thixotropic suspension having obviously greater utility than in its form as a non-thixotropic suspension.

Aluminum hydroxide gel in the form as heretofore used is of utility in reducing the acidity of the gastro-intestinal tract by neutralization and adsorption of the hydrochloric acid and pepsin of the gastric juices, to form more or less neutral mixtures, and thus allows for conditions that promote healing in peptic ulcer areas of the gastro-intestinal tract.

However, it has been shown that aluminum hydroxide gel may, under certain conditions, produce untoward effects, in that it may produce a phosphorus deficiency in the presence of a pancreatic deficiency or low phosphorus diet, by combining with the phosphate in the intestinal tract. Furthermore, prolonged administration of aluminum hydroxide may cause constipation in susceptible individuals.

Tribasic magnesium phosphate is also of value in reducing the acidity of the gastro-intestinal tract. However, its use as heretofore, in powdered form, has not proven satisfactory, since dosages in powdered form are difficult to regulate. Furthermore, its excessive laxative action, when employed alone, argues against its use in the therapeutic amounts required to act efficiently.

The equilibrium mixture of the present invention provides a balance, as is above pointed out at the forepart of this specification, of pure, clearly defined, insoluble chemicals, which makes possible the attainment of the well-known advantages of alumina as a gastro-intestinal antacid in a manner that is not accomplished by the aforesaid disadvantages in this use of alumina alone, such as phosphate depletion and constipation. With the equilibrium mixture of the present invention the disadvantages of the effect of the alumina in respect of phosphate depletion and constipation are counterbalanced by the effect of the presence of, respectively, the phosphate compounds and the magnesium compounds in the equilibrium mixture.

Under the reaction of the present invention, as typified by the previously given batch record example, when the initial reactants, aluminum hydroxide and magnesium phosphate, are subjected to a stress involving an increase of temperature from 25° C. up to at least 75° C., at the thermally induced increased pressure, for periods of time of the order of several hours, the mixture undergoes physical and chemical changes, in that it becomes highly gelatinous and thixotropic, and the equilibrium relationships are altered. When cooled, the mixture continues to exhibit the property of thixotropy, and syneresis is minimized. The properties of increased gelation and thixotropy remain, and are not lost over a long period of time.

Whereas before the step of heating with retention of pressure the mixture is only slightly, if at all, thixotropic, after the completion of this heating to at least 75° C., under pressure, the mixture is observed to be highly thixotropic, and requires agitation or stirring for liquefaction. Furthermore, syneresis is minimized by the heating to at least 75° C., under such induced pressure. This step in the process thus acts as a method of stabilization, since the components do not thereafter (on standing) settle out of the liquid vehicle of the mixture, as they otherwise would.

The non-settling, uniform, and thixotropic equilibrium mixture of tribasic magnesium phosphate, aluminum hydroxide, aluminum phosphate, and magnesium hydroxide has novel advantages in the art. For example, in the treatment of the gastro-intestinal tract, the gel mixture of the cited batch record example neutralizes almost twice the quantity of hydrochloric acid as does plain alumina gel, U. S. P. Its stability, as shown by its non-settling character, provides known, uniform dosages for successful therapeutic use.

The invention as hereinabove set forth is embodied in particular form and manner but may be variously embodied within the scope of the claims hereinafter made.

We claim:

1. A pharmaceutical antacid preparation of original starting material comprising 4-8 per cent aluminum hydroxide gel and 2-8 per cent magnesium phosphate.

2. A pharmaceutical antacid preparation comprising 5.5% aluminum hydroxide gel and 4 per cent, magnesium phosphate.

3. A process for preparing a thixotropic gel which comprises: heating to a temperature above room temperature, while under the thermally induced pressure, a mixture of original starting material comprising one of the group consisting of aluminum hydroxide and magnesium hydroxide, and one of the group consisting of aluminum phosphate and magnesium phosphate, while they are in suspension in water, the hydroxide being of one of the two metals of said groups, and the phosphate being of the other of the two metals of said groups, until the mixture undergoes physical and chemical changes becoming a highly gelatinous and thixotropic gel capable of subsequent alternate liquefaction on shaking and setting up spontaneously into a rigid gel upon standing undisturbed.

4. A process as claimed in claim 3, and in which the mixture is heated to a temperature within the range of 75° C. to 85° C., and under thermally induced pressure.

5. A process of preparing a thixotropic gel which comprises: heating to a temperature above room temperature, while under the thermally induced pressure, a mixture of original starting materials comprising aluminum hydroxide and magnesium phosphate, while they are in suspension in water, until the mixture undergoes physical and chemical changes becoming a highly gelatinous and thixotropic gel capable of subsequent alternate liquefaction on shaking and setting up spontaneously into a rigid gel on standing undisturbed.

6. A process as claimed in claim 5, and in which the mixture is heated to within the range of 75° C. to 85° C., and under the thermally induced pressure.

7. A process of preparing a thixotropic gel which comprises: heating to a temperature above room temperature, while under the thermally induced pressure, a mixture of original starting materials comprising 4-8 per cent aluminum hydroxide and 2-8 per cent magnesium phosphate, while they are in suspension in water, until the mixture undergoes physical and chemical changes becoming a highly gelatinous and thixotropic gel capable of subsequent alternate liquefaction on shaking and setting up spontaneously into a rigid gel on standing undisturbed.

8. A process as claimed in claim 7, and in which the mixture is heated to within the range of 75° C. to 85° C., and under the thermally induced pressure.

9. A process of preparing a thixotropic gel which comprises: heating to a temperature above room temperature, while under the thermally induced pressure, an equilibrium mixture of original starting materials comprising aluminum hydroxide, magnesium phosphate, aluminum phosphate, and magnesium hydroxide, while they are in suspension in water, until the mixture undergoes physical and chemical changes becoming a highly gelatinous and thixotropic gel capable of subsequent alternate liquefaction on shaking and setting up spontaneously into a rigid gel on standing undisturbed.

10. A process as claimed in claim 9, and in which the mixture is heated to within the range of 75° C. to 85° C., and under the thermally induced pressure.

HARRY EISENBERG.
BENJAMIN WILSON ALLAN.
REUBEN ROSEMAN.

REFERENCES CITED

The following references are of record in the file of this patent:

UNITED STATES PATENTS

| Number | Name | Date |
|---|---|---|
| 2,294,889 | Barol | Sept. 8, 1942 |

OTHER REFERENCES

Chemical Abstracts, vol. 38, page 5301 (1944). (Copy in Div. 43.)

Gutman: Modern Drug Encyclopedia, 3rd ed. (June 1946), page 395 ("Kalmose"). (Copy in Div. 43.)